(No Model.) 3 Sheets—Sheet 1.
J. GWYNNE.
CENTRIFUGAL OR ROTARY PUMP.
No. 342,297. Patented May 18, 1886.
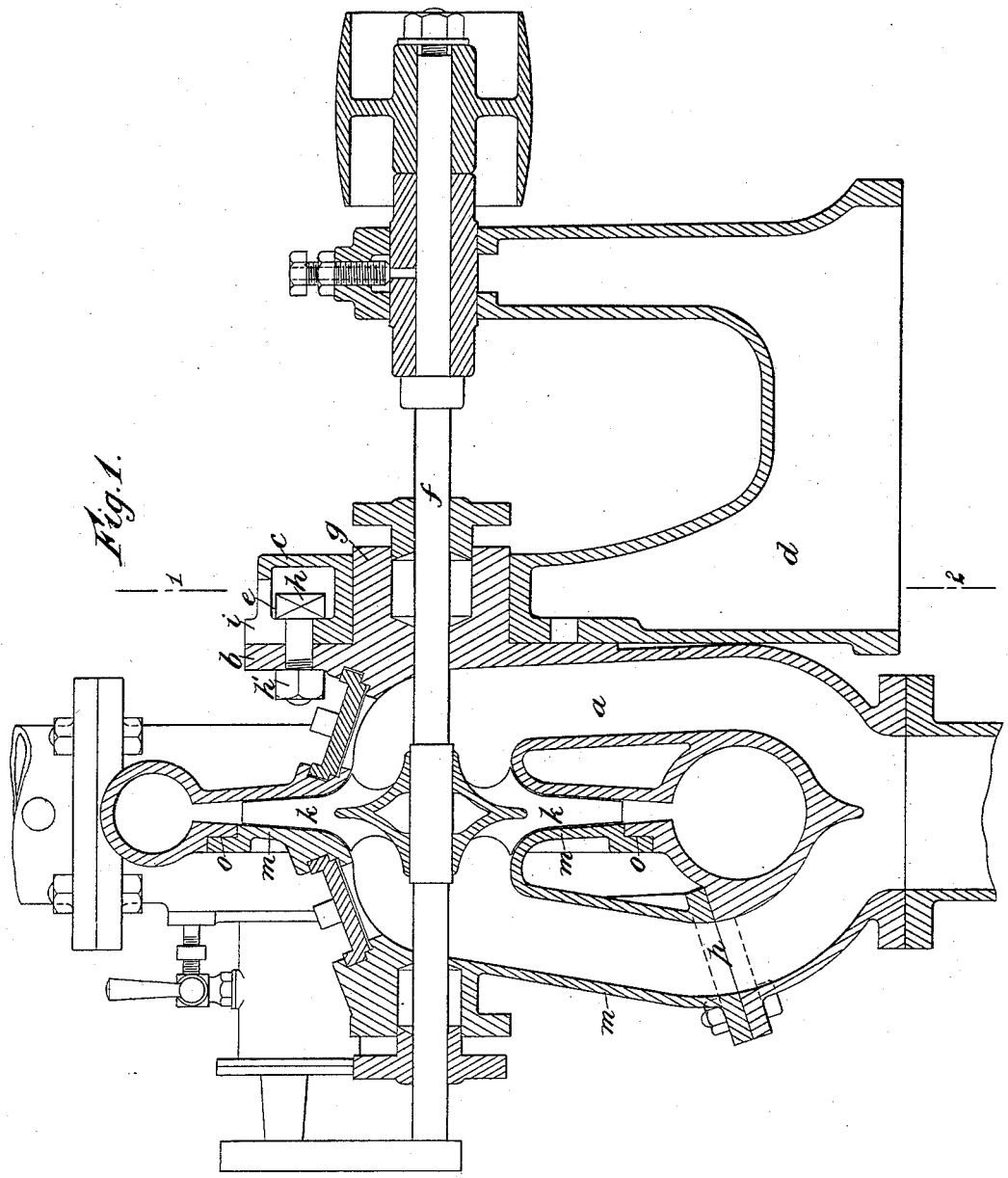

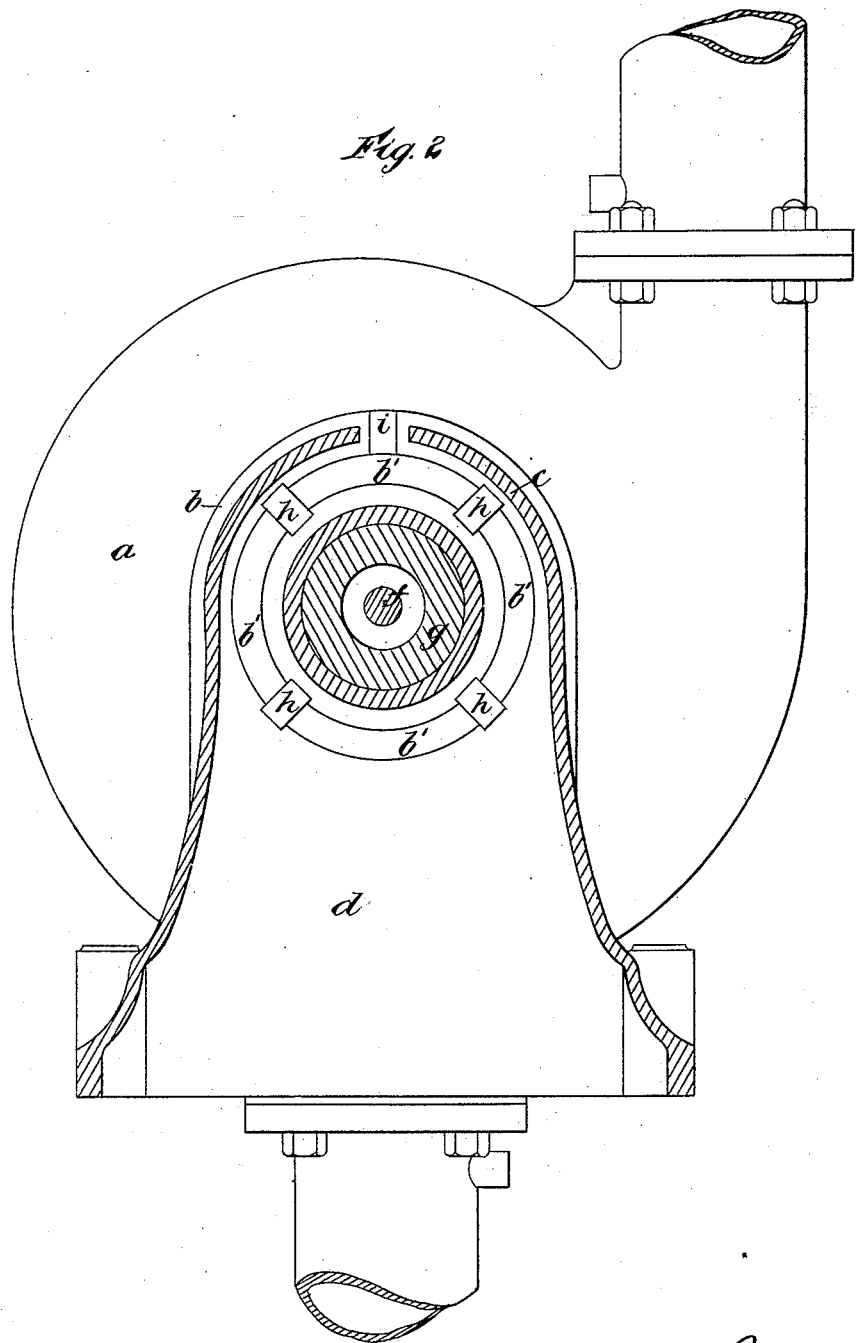

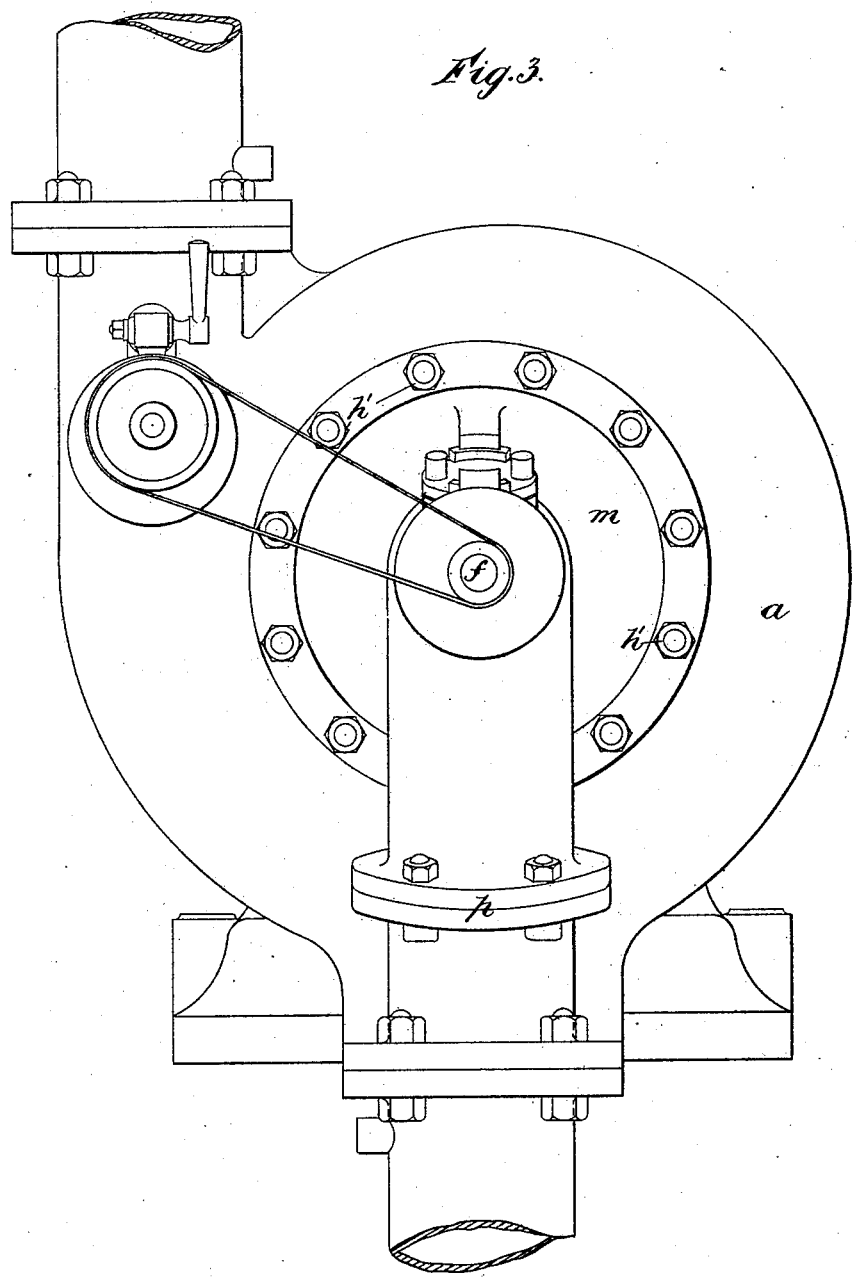

UNITED STATES PATENT OFFICE.

JOHN GWYNNE, OF LONDON, ENGLAND.

CENTRIFUGAL OR ROTARY PUMP.

SPECIFICATION forming part of Letters Patent No. 342,297, dated May 18, 1886.

Application filed April 1, 1885. Serial No. 160,898. (No model.) Patented in England July 23, 1878, No. 2,922, and November 18, 1878, No. 4,670; in France October 26, 1878, No. 127,168; in Germany December 25, 1878, No. 5,949; in Belgium January 4, 1879, No. 47,090; in Italy March 31, 1879, No. 294, and in Austria-Hungary May 26, 1879, No. 13,371.

*To all whom it may concern:*

Be it known that I, JOHN GWYNNE, a subject of the Queen of Great Britain and Ireland, residing at the city of London, Kingdom of Great Britain and Ireland, have invented new and useful Improvements in Centrifugal or Rotary Pumps, (for which I have obtained patents in Great Britain, No. 2,922, bearing date July 23, 1878, and No. 4,670, bearing date November 18, 1878; in Belgium, No. 47,090, bearing date January 4, 1879; in France, No. 127,168, bearing date October 26, 1878; in Germany, No. 5,949, bearing date December 25, 1878; in Italy, No. 294, bearing date March 31, 1879, and in Austria-Hungary, No. 13,371, bearing date May 26, 1879,) of which the following is a specification.

My invention relates to improvements in centrifugal or rotary pumps, and has for its objects to allow of the pump-case, with its suction and discharge pipes, being swiveled upon the frame or support that carries the same, so that said suction and discharge pipes may be placed at any angle without interfering with said frame or support or with the motor that actuates the pump, and to enable the pump-disk to be removed from or replaced upon its driving-spindle within the pump-case without disturbing the suction or discharge pipes.

In the accompanying three sheets of illustrative drawings, Figure 1 shows in central transverse section a centrifugal pump embodying my invention; and Fig. 2 is a section of the same in the line 1 2, Fig. 1. Fig. 3 is a front elevation of the left-hand end of Fig. 1.

$a$ is the pump-case. It is made to swivel as follows: $b$ is a flange or part of the pump-case; $c$, a flange or part of the frame $d$. $e$ is a circular T-shaped channel formed in the flange $c$. A turned circular fillet, $b'$, projects from the face of the flange $b$ and takes into and fits accurately the narrower portion or neck of the T-shaped channel, and, being concentric with the pump-shaft or spindle $f$, is able to turn in the said channel when the pump-case is revolved. $g$ is a turned hollow boss, which also accurately fits a corresponding hole in the frame $d$, and is able to turn therein when the pump-case is revolved. By the fillet $b'$ and hollow boss $g$, the concentricity of the pump-case with the shaft or spindle $f$ is maintained.

$h\ h$ are bolts or fastenings with nuts $h'$, whereby the flange $b$ is secured to or connected with the flange $c$. The heads of these bolts or fastenings $h$ are made as shown in Fig. 1, and they fit freely in the wider part of the T-shaped channel $e$. When the nuts are tightened, the pump-case is held by the bolts with its flange $b$ firmly against that of the frame $d$. When the nuts are not tightened up, the bolt-heads allow of the flange $b$, and consequently the pump-case, being turned or swiveled, so as to bring the suction and delivery passages to any desired angle without interfering with the motor or the frame. The bolt-heads are introduced into the T-shaped channel through a T-shaped opening, $i$, passing through the periphery of the flange $c$ and into the T-shaped channel $e$, as shown in Fig. 1, each bolt being afterward moved round into a suitable position in the channel $e$. The opening $i$ may be provided with a cover, if desired. When the bolt has been introduced into the T-shaped channel, and the pump-case has been placed in a position concentric with the shaft, the bolt ends are moved into positions opposite the holes in the flange $b$, the pump-case is then moved home, and the nuts are screwed on. It will be evident that the T-shaped groove may be in flange $b$, the flange $c$ being then plain.

In the front side of the pump-case $a$ is formed an opening sufficiently large to admit of inserting the pump-disk $k$ onto its spindle $f$ through the said opening, which is afterward closed or filled up by a removable piece or cover, $m$, secured to the case by nuts and bolts $n$, so as to form a uniform continuation thereof, as if all were cast in one piece. The removable piece or cover $m$, when fitted in its place over the opening in the pump-case, forms with the latter a recessed flange-joint, $o$, while its suction-joint $p$, with the suction-chamber of the case, may be either made at an angle struck from its front edge upward toward the case, as shown, or from either side at a downward or upward angle; or the joint $o$ may be arranged in any other convenient manner. By the described arrangement the pump-disk can be taken out and replaced without disturbing the suction or discharge pipe. If desired, both sides of the pump-case may be formed with openings provided with removable pieces or covers.

What I claim is—

1. A centrifugal or rotary pump provided with a case swiveled at the center, whereby the suction and delivery pipes are brought to any required angle without the removal of bolts, substantially as described.

2. A centrifugal pump provided with a case swiveled upon a center or boss, said case having bolts whereby it can be fixed in the position to which it has been turned, substantially as described.

3. A centrifugal pump provided with a case swiveled upon a center, in combination with a frame or support and bolts, whereby said case is made capable of turning upon a center and being fastened in the position to which it has been turned, substantially as described.

4. In a centrifugal pump, the combination of a case, $a$, with flange $b$, boss $g$, and fillet $b'$, a frame, $d$, with flange or part $c$, having a central opening for the boss, and a T-shaped groove or opening to receive the fillet, and suitable connecting-bolts traveling in said groove or opening, whereby the pump-case can be swiveled to bring the suction and delivery pipes to any required angle without removal of any of said bolts, substantially as described.

5. A centrifugal pump provided with a case swiveled upon a center or boss, in combination with a removable cover or piece, whereby the pump disk and shaft or fan and spindle can be removed from the case without disturbing any other portion of the machine, substantially as described.

JOHN GWYNNE.

Witnesses:
  W. J. H. WEIR,
    *Patent Agent, London.*
  WALTER WILLIAM WILKES,
    *Clerk, 27 Bromar Road, Denmark Hill, London.*